United States Patent [19]

Watanabe et al.

[11] Patent Number: 5,032,927

[45] Date of Patent: Jul. 16, 1991

[54] IMAGE SIGNAL RECORDING APPARATUS CAPABLE OF RECORDING COMPRESSED IMAGE DATA TOGETHER WITH AUDIO DATA

[75] Inventors: Mikio Watanabe; Kenji Ito; Seiki Nishi, all of Tokyo, Japan

[73] Assignee: Fuji Photo Film Co., Ltd., Kanagawa, Japan

[21] Appl. No.: 317,517

[22] Filed: Mar. 1, 1989

[30] Foreign Application Priority Data

Mar. 1, 1988 [JP] Japan .................................. 63-45760
Mar. 8, 1988 [JP] Japan .................................. 63-52711

[51] Int. Cl.$^5$ .............................................. H04N 5/76
[52] U.S. Cl. .................................... 358/335; 358/310; 358/909; 358/12; 358/133; 358/343
[58] Field of Search ............... 358/310, 330, 334, 335, 358/12, 13, 135, 133, 138, 141, 432, 433, 260, 341, 136, 79; 360/32, 33.1, 137; 382/39, 43, 569, 41, 50

[56] References Cited

U.S. PATENT DOCUMENTS

| | | | |
|---|---|---|---|
| 4,022,968 | 5/1977 | Keizer | 358/342 |
| 4,280,159 | 7/1981 | Nakayama | 360/137 |
| 4,633,330 | 12/1986 | Yamamitsu et al. | 358/310 |
| 4,691,329 | 9/1987 | Juri et al. | 382/43 |
| 4,776,030 | 10/1988 | Tzou | 358/432 |
| 4,807,029 | 2/1989 | Tanaka | 358/135 |
| 4,845,559 | 7/1989 | Labit et al. | 358/135 |
| 4,860,112 | 8/1989 | Nichols et al. | 382/56 |

Primary Examiner—Roy N. Envall, Jr.
Assistant Examiner—Thai Tran
Attorney, Agent, or Firm—Birch, Stewart, Kolasch & Birch

[57] ABSTRACT

An image signal recording apparatus achieves an orthogonal transform and a compression coding on image data so as to record the resultant data in a recoding medium. There is disposed a selector to select a compression ratio for the compression coding of the data, namely, the compression ratio is selectable. The selected compression ratio data is recorded in the recording medium together with the image data. A playback apparatus reads from the recording medium the compression ratio data together with the image data undergone the compression coding so as to decode the image data by use of the compression ratio data. In consequence, according to these apparatuses, the compression ratio can be arbitrarily set. In addition, the image signal recording apparatus generates recording codes associated with the amounts of the image data and the audio data so as to write the codes in the recording medium. The recording codes are read from the recording medium, so that the remaining amount of the recording medium available for the recording operation is displayed.

11 Claims, 10 Drawing Sheets

FIG. 4A

| 120 | 127 | 108 | 97 |
|-----|-----|-----|-----|
| 107 | 120 | 89 | 96 |
| 89 | 90 | 99 | 90 |
| 110 | 128 | 116 | 101 |

FIG. 4B

| 200 | 150 | 80 | 20 |
|-----|-----|-----|-----|
| 150 | 130 | 70 | 60 |
| 100 | 90 | 40 | 10 |
| 50 | 50 | 10 | 5 |

FIG.4C

| 8 | 4 | 2 | 1 |
|---|---|---|---|
| 4 | 4 | 2 | 1 |
| 2 | 2 | 1 | 0 |
| 1 | 0 | 0 | 0 |

FIG.4D

| 8 | 6 | 4 | 4 |
|---|---|---|---|
| 6 | 6 | 4 | 3 |
| 4 | 4 | 4 | 2 |
| 3 | 2 | 2 | 2 |

IMAGE SIGNAL RECORDING APPARATUS CAPABLE OF RECORDING COMPRESSED IMAGE DATA TOGETHER WITH AUDIO DATA

BACKGROUND OF THE INVENTION

1. Field of the Invention

The present invention relates to a recording apparatus and a playback apparatus of image signals, and in particular, to a compression recording apparatus in which obtained image signals are compressed so as to record the compressed data on a recording medium, an expansion playback apparatus in which the compressed data is read from the recording medium so as to be expanded for a playback operation, and a recoding apparatus in which the data of image signals is recorded together with data of voice or audio signals on a recording medium.

2. Description of the Prior Art

In a case where image signals produced by a solid-state imaging apparatus such as a charge-coupled device, CCD are stored in a storage for example, a memory card or a magnetic disk, data of the image signals are required to be compressed, by taking the capacity of the storage into consideration, to a small capacity. As a method of compressing image data, there has been known, for example, a orthogonal transform coding, which will be described below.

First, an image represented by the image signals is subdivided into a predetermined number of blocks so as to conduct a orthogonal transform on data of pixels for each subdivided block.

In the image signals, a low-frequency component thereof occupies a large portion with respect to power, whereas a high-frequency component, although not occupying a great power portion, is considerably significant in a sense of information. In addition, visual characteristics vary between these components. In this situation, the image signals are converted into such low- and high-frequency components so as to respectively undergo suitable quantization, thereby storing coded signals in a storage such as a memory card. On the playback side, the coded signals read from the storage are reversely transformed to attain the original signals.

Incidentally, when considering the storage of image signals on a memory card, it is desirable to use greater compression ratio of the image data. However, a reproducibility of an image or a picture quality is naturally influenced by the image data compression ratio. In consequence, since a high reproducibility is required depending on a purpose of the user, there may appear a disadvantage if the image data compression ratio is increased regardless of various cases. On the other hand, it is economically disadvantageous to prepare a plurality of apparatuses associated with different compression ratios; in consequence, there is desired an apparatus capable of changing the image data compression ratio depending on the requirement, which further leads to a need for a playback apparatus capable of reproducing an image according to the change in the compression ratio in the recording operation.

For the requirement above, there has been proposed an apparatus, for example, in the Japanese Patent Laid-Open No. 61-135286. In this apparatus, after data of pixels undergo a orthogonal transform, a coefficient omission threshold value is set such that a subtraction of this threshold value is conducted on the image data, thereby effecting the compression of the data. Namely, in the subtraction of the threshold value from the image data, the threshold value is varied so as to select a picture quality of the reproduced image. In the case of this apparatus, after the subtraction of the threshold value is effected on the image data, a bit allocation to record data in an external memory such as a memory cartridge, namely, an coding operation is achieved depending on uniform data. In consequence, in a playback apparatus, after data read from the external memory is decoded, it is necessary to add thereto the threshold value employed in the compression of the data; in consequence, data of the threshold value is required to be supplied to the playback apparatus for each playback operation.

On the other hand, it has been known to store still image signals together with audio signals on a storage such as a memory card or a magnetic disk.

In a recording operation on such a storage, for example, it is desirable that voices attained from an object at the respective image shooting operations and data of voices, for example, of an explanation of an obtained image are recorded together with the image data. In such a case, audio data is recorded on a recording medium together with the image data.

Incidentally, since the amount of image data does not vary between respective still images, namely, a fixed amount of image data is produced for each sheet of still picture, a fixed amount of recording area is used in the storage when a picture is recorded. Consequently, the operator need only count the number of stored still pictures, in a case where the storage capacity of the recording medium is known, to obtain the number of pictures to be further stored therein, namely, the remaining storage area of the recording medium.

In contrast thereto, for the audio data, the length of the voices associated with a picture is variable, and hence the amount of the audio data changes between pictures. Consequently, when the audio data are stored in a recording medium together with the image or picture data, the amount of the picture and voice data to be further recorded in the recording medium, namely, the remaining available storage capacity of the recording medium cannot be attained only by counting the number of the pictures already recorded therein. In this situation, it is desired to display the number of pictures as well as the period of voice available for the recording operation, namely, the remaining storage capacity for the pictures as well as for the voice.

SUMMARY OF THE INVENTION

It is therefore an object of the present invention to provide a compression recording apparatus in which when image data is to be subjected to a compression encoding so as to be stored in a storage, the operator can select a compression ratio of the image data and selection data of the compression ratio is stored in the storage together with the image data and to provide an expansion playback apparatus for reproducing image from the image data thus stored.

In addition, another object of the present invention is to provide an image signal recording apparatus in which image data and audio data are recorded on a recording medium such that the remaining amount of the recording medium available for the image data and the audio data is displayed.

According to the present invention, the compression recording apparatus for receiving image signals so as to effect a compression coding on image data thereof to record the resultant signals on a recording medium includes blocking means for dividing the image data into blocks, orthogonal transform means for achieving a orthogonal transform on the image data blocked by the blocking means, coding means for compressing and for coding the image data undergone the orthogonal transform by the orthogonal transform means, selecting means for selecting compression ratio data to be used for a compression coding effected by the coding means on the image data undergone the orthogonal transform, and data write means for writing in a recording medium the image data undergone the compression coding according to the compression ratio data selected by the selecting means and the compression ratio data. The data write means writes the image data undergone the compression coding and the compression ratio data in respective different areas of the recording medium.

In addition, according to the present invention, the image signal expansion playback apparatus includes data read means for respectively reading the image data undergone the compression coding and the compression ratio data from the recording medium recorded by the image signal compression recording apparatus and expansion decoding means for achieving an expansion decoding on the image data undergone the compression coding by use of the compression ratio data read from the recording medium by the data read means, thereby conducting an expansion playback of the image data compressed, coded, and recorded on the recording medium.

In addition, according to the present invention, there is provided an image signal recording apparatus for recording in a recording medium image data of image signals produced from imaging means together with audio data of audio signals collected by voice collecting means including recording code generating means for generating recording codes depending on amounts of the image data and the audio data to be recorded in the recording medium, data input/output control means for writing the image data and the audio data in the recording medium and for controlling read and write operations of the recording codes produced by the recording code generating means with respect to the recording medium, and recording medium remainder display means for displaying a remaining amount of the recording medium available for the recording operation wherein the data input/output control means reads a recording code recorded in the recording medium so as to cause the recording medium remainder display means to display the remaining amount of the recording medium available for the recording operation.

BRIEF DESCRIPTION OF THE DRAWINGS

The objects and features of the present invention will become more apparent from the consideration of the following detailed description taken in conjunction with the accompanying drawings in which:

FIG. 4A is a diagram showing an example of pixel data;

FIG. 4B is a diagram showing an example of data attained through a orthogonal transform conducted on the pixel data of FIG. 4A;

FIGS. 4C-4D are diagrams showing examples in which the number of bits is assigned in an coding of data of FIG. 4B;

DESCRIPTION OF THE PREFERRED EMBODIMENTS

Referring now to the accompanying drawings, description will be given of an image signal compression recording apparatus and an image signal expansion playback apparatus according to the present invention.

Figure 1:
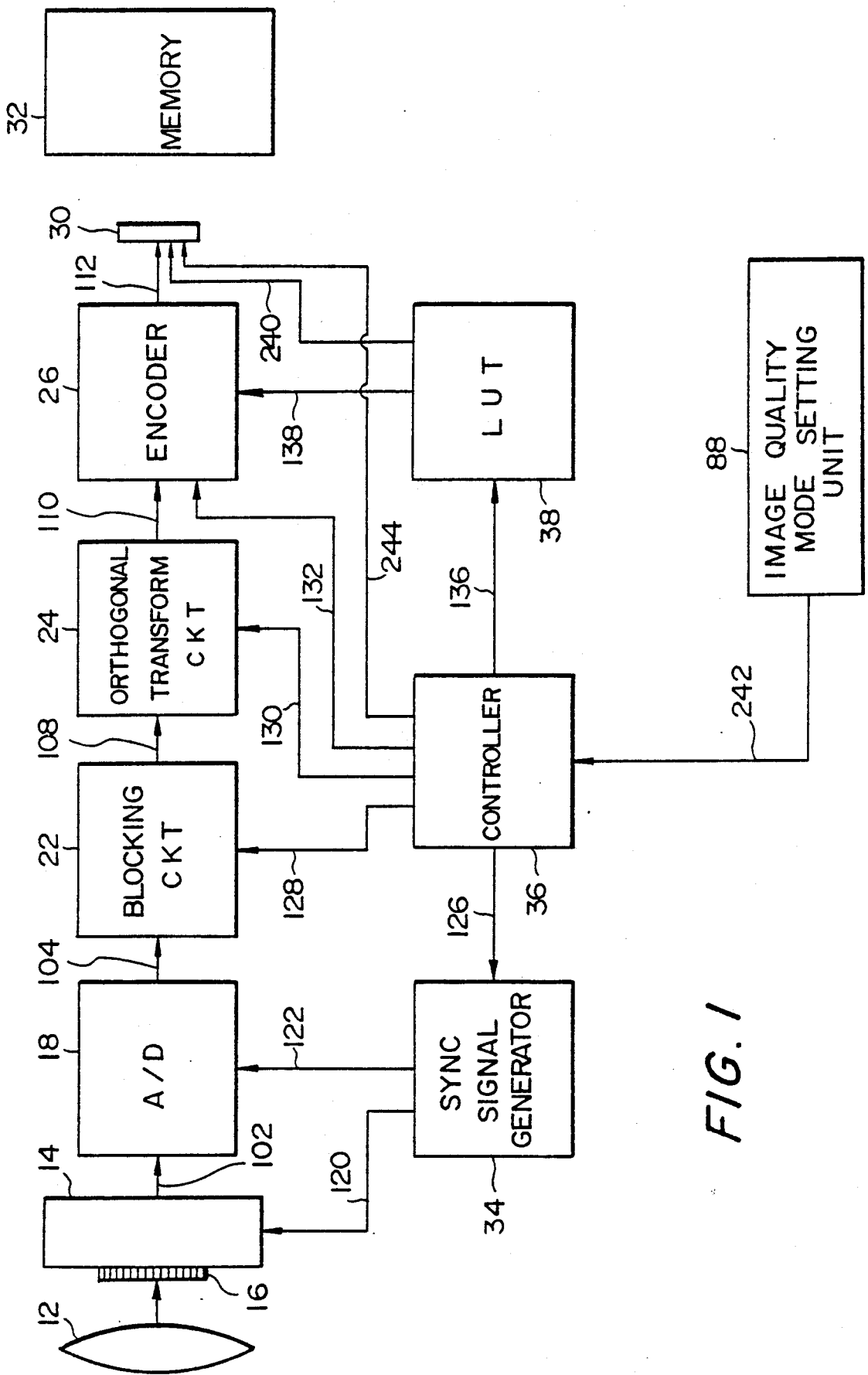
FIG. 1 is a schematic block diagram showing an embodiment in which an image signal compression recording apparatus according to the present invention is applied to a digital electronic still camera.

FIG. 1 shows an embodiment in which an image signal recording apparatus according to the present invention is applied to a digital electronic still camera. Incidentally, other components of the camera not directly related to the explanation of the present invention, for example, mechanisms for a shutter, an iris, and a film are omitted.

The apparatus of FIG. 1 includes a master lens 12 followed by an imaging or image pickup device 14 for converting an optimal image of an object focused by the master lens 12, the imaging device 14 being provided with a color filter 16 on a surface thereof. The imaging device 14 is operative in response to a synchronization or sync signal supplied from a sync signal generate circuit 34 through a signal line 120 so as to convert the optical image of an object. The image signal produced from the imaging device 14 is sent via a signal line 102 to an analog-to-digital (AD) converter circuit 18, which converts the image signal sent from the imaging device 14 into a digital signal. Incidentally, between the imaging device 14 and the AD converter 18, although not shown, there may be disposed means for the gamma correction and the white balance processing. The color image signal converted by the AD converter circuit 18 into the digital signal is fed via a signal line 104 to a block generator or blocking circuit 22.

Figure 3A:
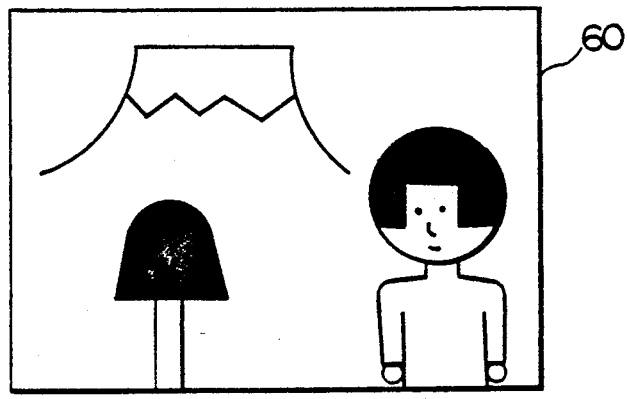
FIG. 3A is a diagram showing an example of an image prior to a blocking operation effected thereon.
Figure 3B:
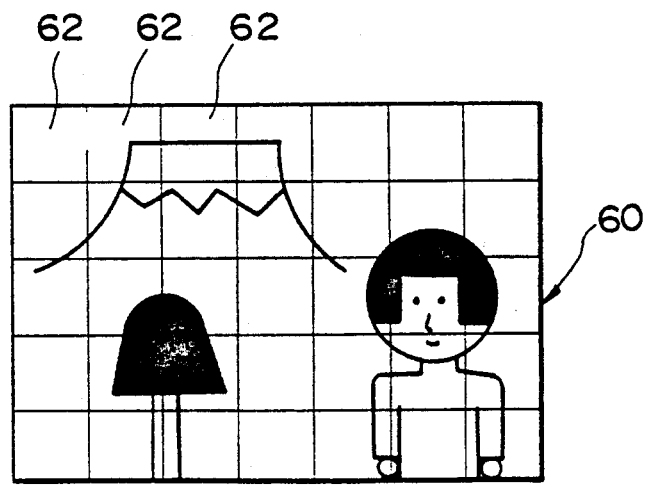
FIG. 3B is a diagram showing an example of an image in which a blocking operation is effected on the image of FIG. 3A.

The blocking circuit 22 achieves a block generation on the image signal including pixels of red, R; green, G; and blue, B components supplied from the AD converter 18 so as to produce a predetermined number of blocks therefrom. The blocking operation is effected, for example, such that an image of FIG. 3A is subdivided into a plurality of areas or blocks 62, 62, 62, ... as shown in FIG. 3B. Although the block 62 of FIG. 3B is favorably constituted with, for example, 16×16=256 pixels, the number of pixels constituting the block need only be selected to be identical to the number of pixels included in an image signal. According to this embodiment, for simplification of the explanation, the block includes 4×4=16 pixels.

The image signal blocked in the blocking circuit 22 is supplied via a signal line 108 to a orthogonal transform circuit 24, which effects a orthogonal transform for each block of the image signal thus blocked. The blocked image signal includes, for example, values of respective pixel levels prior to the orthogonal transform as shown in FIG. 4A. In this example of FIG. 4A, the pixel at the upper-left corner has a level of 120 in the digital data, the pixel on the right thereof has a level of 127, and the third pixel possesses a level of 108; furthermore, the pixel at the left end of the second row has a level of 107 and the pixel on the right thereof is of a level of 120.

Conducting an orthogonal transform on the data, there is provided, for example, data shown in FIG. 4B. As to the orthogonal transform, the Hadamard transform, the cosine transform, and the Fourier transform have been known, for example. In the data having undergone the orthogonal transformation as shown in FIG. 4B, the abscissa and ordinate axis directions are associated with the frequency components respectively along the horizontal and vertical directions of the screen. In addition, in the data arrangement, data of the lower-frequency components and data of the higher-frequency components are respectively located in the upper-left and lower-right positions, namely, the change ratio between the adjacent pixels increases in this direction. In a general image, as already described, the low-frequency component occupies a larger portion with respect to power and the high-frequency component appears only in a smaller portion. As a consequence, in the data undergone the orthogonal transform as shown in FIG. 4B, the greater value appears in the upper-left position and the value decreased as the location moves to the right and downward.

The signal on which the orthogonal transform is effected by use of the orthogonal transform circuit 24 is delivered via a signal line 110 to an encoder 26.

The encoder 26 encodes image data inputted thereto depending on data for the encoding sent from a lookup table 38 via a signal line 138.

The encoding is effected, in a case where the input image data is, for example, data of an array as shown in FIG. 4B, such that a predetermine number of bits are allocated to each data item. That is, depending on an image pattern of each subdivided block, data associated with the encoding is supplied from the lookup table 38 to the encoder 26 so as to effect the encoding operation according to the image pattern of each block, namely, a larger number of bits are allocated to an image pattern associated with the greater variation in the block and a smaller number of bits are allocated to an image pattern for which the smaller change occurs in the block.

Data for the allocation of the number of bits is set in response to a control signal delivered via a signal line 136 to the lookup table 38 according to mode select data sent from an image or picture quality mode setting unit 88 via a line 242 to a controller 36. Incidentally, according to this embodiment, the image quality mode setting unit 88 is provided with two kinds of mode select switches for the standard mode and the high image quality mode so as to be selected by the operator. For example, in a case where the standard mode is selected in the image quality mode setting unit 88, an amount of data containing a total of 32 bits (compression ratio=¼) is assigned to a block as shown in FIG. 4C; and in FIG. 4B, the bit allocation is effected as follows, namely, 8 bits are allocated to data 200, 4 bits to data 150, 130, and 150, 2 bits to data 100, 90, 70, and 80, and one bit to data 50, 40, 60, and 20 so as to encode these data items. To those data items arranged in other manner, the bit allocation is not achieved. That is, of the data undergone the processing such as the orthogonal transform, the data items located in the left or right portion of the predetermined range are ignored and hence are not stored. The reason why only the low-frequency component is stored and the high-frequency component is neglected is that the low-frequency component occupies most of the portion of the general image and hence an image can be approximately reproduced even when the high-frequency component is ignored.

In addition, when the high image quality mode is selected in the image mode setting unit 88, an amount of data containing a total of 64 bits (compression ratio=½) is assigned to a block as shown in FIG. 4D; and in FIG. 4B, the bit allocation is effected as follows, namely, 8 bits are allocated to the data 200, 6 bits to the data 150, 130, and 150, 4 bits to the data 100, 90, 40, 70, and 80, 3 bits to the data 60 and 50, and 2 bits to the data 50, 10, 5, and 10. By storing also the high-frequency component in this fashion, it is possible to develope a high reproducibility in the playback operation.

Data coded by the encoder 26 is supplied via a signal line 112 to a connector 30 so as to be stored in a memory 32 connected to the connector 30. As the memory 32, a storage such as a memory card in which, for example, a semiconductor memory is mounted on a substrate in a card-like shape is advantageously employed so as to store therein an encoded still picture.

The connector 30 is also supplied from the lookup table 38 via a signal line 240 with the lookup table data for the coding such as the bit count allocation data described above and the mode selection data, which are also stored in the memory 32.

The sync signal generator 34 is operative in response to a control signal sent from the controller 36 via a signal line 126 so as to generate a sync signal, which is respectively sent via the signal lines 120 and 122 to the imaging device 14 and the AD converter 18, respectively.

The controller 36 is a control section to control the components of this apparatus and sends control signals respectively via the signal line 126 to the sync signal generator 34, via a signal line 128 to the blocking circuit 22, via a signal line 130 to the orthogonal transform circuit 24, via a signal line 132 to the encoder 26, and via the signal line 136 to the lookup table 38, thereby controlling operations of the respective components. In addition, the controller 36 supplies a control signal for a write operation via a signal line 244 to the connector 30 so as to record the data items sent to the connector 30 at the pertinent addresses in the memory 32.

The operation of this apparatus will next be described.

The optical image of the object focused by the master lens 12 is converted by the imaging device 14 from an optical image into a video signal, which is delivered via the signal line 102 to the AD converter 18. The video signal is then converted into a digital signal in the AD converter 18 so as to be sent via the signal line 104 to the blocking circuit 22, which produces therefrom blocked image data to be fed via the signal line 108 to the orthogonal transform circuit 24 effecting a orthogonal transform for each block. Data undergone the orthogonal transform is transmitted via the signal line 110 to the encoder 26, which encodes the data by use of the lookup table 38 such as a selected compression ratio of the data, thereby delivering the encoded data via the signal line 112 to the connector 30.

The image data sent from the encoder 26 to the connector 30 is stored at a predetermine address in the memory 32 in response to a control signal fed thereto from the controller 36 via the signal line 244 thereto. For example, as shown in FIG. 5, image data items of each block outputted from the encoder 26 are stored in the block area of the memory 32.

Figures 5, 6:
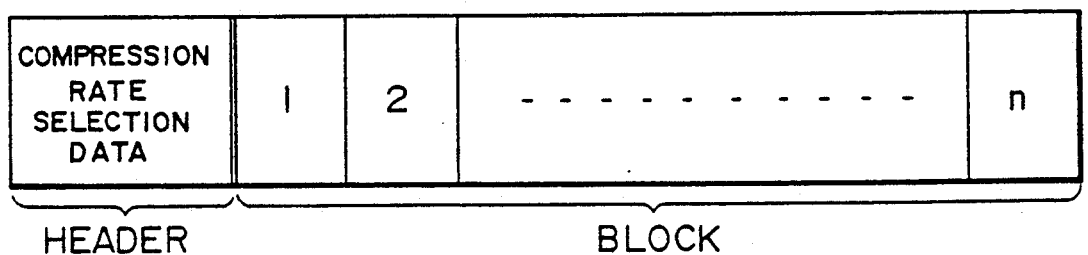
FIG. 5 is a schematic diagram showing an example of storage contents in a recording medium in which image signals are recorded by the apparatus of FIG. 1.
FIG. 6 is a diagram showing another example of the number of bits assigned in the coding of data of FIG. 4B.

In addition, the mode select data supplied from the lookup table 38 is also stored at a predetermined address of the memory 32 according to a control signal similarly sent from the controller 36 via the signal line 244 thereto, for example, in the header area of the memory 32 as shown in FIG. 5.

The data of the still picture shot by the electronic still camera is stored together with the mode select data in the memory such as a memory card.

Figure 2:
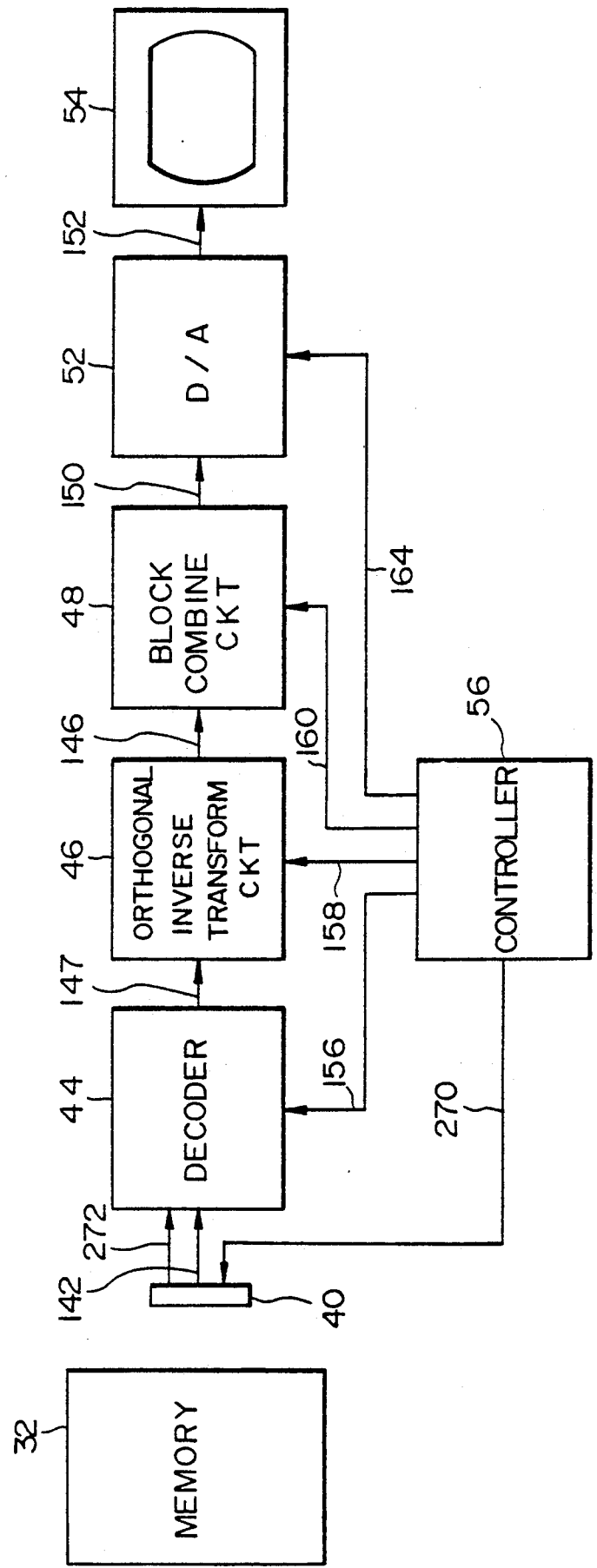
FIG. 2 is a block diagram showing an embodiment of an image signal expansion playback apparatus according to the present invention.

FIG. 2 shows an example of a playback apparatus which reproduces an image obtained by the electronic still camera of FIG. 1 and then stored in the memory 32. This playback apparatus includes a connector 40 to be connected to the memory 32. The connector 40 is linked to a signal line 142. The image data stored in the memory 32 is read out to the connector 40 from the memory 32 beginning from an address specified by a control signal sent thereto from a controller 56 via a signal line 270 so as to be inputted via the signal line 142 to a decoder 44. In addition, the mode select data loaded in the header area of the memory 32 is read out to the connector 40 from the memory 32 beginning from an address specified by a control signal similarly delivered thereto from the controller 56 via the signal line 270 so as to be supplied via a signal line 272 to the decoder 44.

The decoder 44 decodes the data supplied thereto so as to produce data, for example, as shown in FIG. 4B. The decoded data from the decoder 44 is inputted via a signal line 144 to a orthogonal inverse transform circuit 46 so as to be subjected to a orthogonal inverse transform therein. The data of each block undergone the orthogonal inverse transform is delivered via a signal line 146 to a block combine circuit 48 such that data items of the blocks are combined so as to produce the original image data. The data combined by the block combine circuit 48 is transmitted via a signal line 150 to a digital-to-analog (DA) converter 52 so as to be converted into an analog signal, which is then fed via a signal line 152 to a CRT 54, thereby reproducing the color image stored in the memory 32 on a screen of the CRT 54.

The controller 56 is a control section to control the respective components of the apparatus and outputs control signals respectively via a signal line 156 to the decoder 44, via a signal line 158 to the orthogonal inverse transform circuit 46, via a signal line 160 to the block combine circuit 48, and via a signal line 164 to the DA converter 52, thereby controlling operations of the respective components. In addition, the controller 56 sends a control signal for a read operation via the signal line 270 to the connector 40, so that the image data and the mode select data respectively stored at predetermined addresses in the memory 32 are read out therefrom.

Next, the operation of the playback apparatus will be described.

When the memory 32 is mounted on the playback apparatus, image data stored at a predetermined address in the memory 32 is read out to the connector 40 in response to a control signal from the controller 56 so as to be supplied via the signal line 142 to the decoder 44. That is, the image data items of the respective blocks stored in the block areas of FIG. 5 are read out to the connector 40 so as to be inputted to the decoder 44. In addition, the mode select data stored at the predetermined address of the memory 32 is also read out to the connector 40 in response to a control signal from the controller 56 and is then delivered via the signal line 272 to the decoder 44.

The image data received by the decoder 44 is decoded by use of data for a decoding operation selected according to the mode select data sent via the signal line 272 to the decoder 44 such that the decoded data is fed via the signal line 144 to the orthogonal inverse transform circuit 46, which in turn conducts a orthogonal inverse transform on the data, thereby attaining data for each block, for example, as shown in FIG. 4A. The data in the unit of a block sent via the signal line 146 to the block combine circuit 48 are combined therein so that the resultant data is sent via the signal line 150 to the DA converter 52, which conducts a DA conversion on the data to obtain an analog signal. The analog signal is delivered via the signal line 152 to the CRT 54, thereby displaying a playback image of the original still image on the screen of the CRT 54.

As described above, according to the electronic still camera of FIG. 1, the image data produced by the imaging device 14 is processed so as to generate data blocks such that the orthogonal transform is carried out for each data block, which is then encoded so as to be stored in the memory 32. In consequence, since the image data is compressed and is then stored in the memory 32, a large amount of image data can be stored in the memory 32 having a small capacity. Furthermore, the compression ratio of the image data can be selected by use of a lookup table, and hence the picture quality in a playback operation of the compressed image data to be stored in the memory 32 is selected for the encoding of the image data. The operator may determine the number of pictures to be stored in the memory 32 by selecting the compression ratio as described above.

In addition, the compression of the image data is achieved when the image data is encoded, which enables the circuit configuration to be simplified.

According to the apparatus of FIG. 1, since the mode select data is stored in the memory 32 at an address different from an address where the image is stored therein, when a playback operation is conducted on the data by use of the playback apparatus of FIG. 2, it is possible to achieve a decoding operation according to the mode of encoding operation accomplished by the apparatus of FIG. 1. Incidentally, in this embodiment, although the mode select data is stored in the header area of the memory 32, the mode select data may also be stored, for example, so as to be added to each image data in the memory 32.

According to the present invention, in the apparatus of FIG. 1, although the picture quality mode setting unit 88 is provided with two kinds of mode select switches, namely, for the standard mode and the high picture quality mode, it is also possible to dispose a mode as an alternative embodiment in which when an object is shot by a digital electronic still camera, only the contour thereof is reproduced, that is, there may be arranged a contour extract mode to obtain a playback image of image data like a line drawing. In this contour extract mode, the playback operation is carried out such that when image data is encoded in the encoder 26, the bit count allocation is achieved only for data of the high-frequency component for which a large difference appears between adjacent pixels in the data array described above. According to the contour extract mode, for example, as shown in FIG. 6, a total of 8 bits (compression ratio 1/16) are allocated to a block, which enables the number of bits to be allocated to be minimized, as a consequence, the compression ratio of the image data may be increased and hence it is possible to store a larger amount of image data in the memory 32. Incidentally, in a case where the encoding is accomplished in the contour extract mode, it is necessary to set the decode data such that the decoding can be achieved in this mode also in the playback apparatus of FIG. 2.

Figure 7:
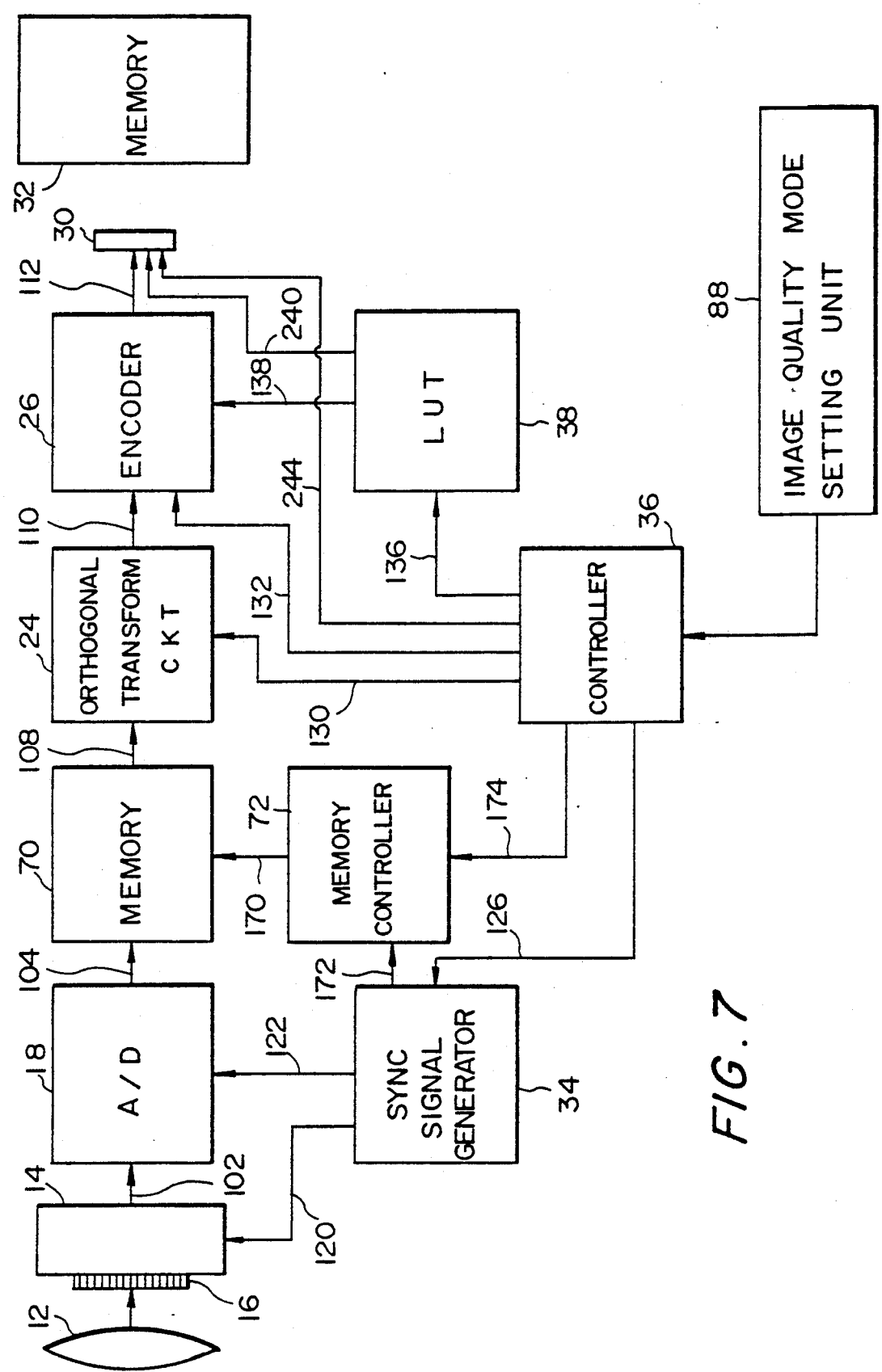
FIG. 7 is a schematic block diagram showing an alternative embodiment in which an image signal compression recording apparatus according to the present invention is applied to a digital electronic still camera.

FIG. 7 shows an alternative embodiment in which an image signal compression recording apparatus according to the present invention is applied to a digital electronic still camera.

In this embodiment, an AD converter 18 produces an output, which is supplied via a signal line 104 to a memory 70. The memory 70 is supplied with a control signal from a memory controller 72 via a signal line 170. A digital signal sent from the AD converter 18 is temporarily stored in the memory 70 such that the stored data is fed in a blocked form of image data to a orthogonal transform circuit 24 in response to a control signal from the memory controller 72, which is supplied with a control signal from a controller 36 supervising the overall apparatus via a signal line 174 and with a sync signal from a sync signal generator 34 via a signal line 172.

The other components of this apparatus are identical to those of the apparatus of FIG. 1.

In the embodiment of FIG. 7, a signal of an image data read out from the AD converter 18 is stored in the memory 70 so as to be read therefrom in a blocked format according to a control signal from the memory controller 72. In consequence, the memory 70 and the memory controller 72 correspond to the blocking circuit 22 of the apparatus of FIG. 1 and hence generates image data blocks. Since the other operations are the same as those of the embodiment of FIG. 1, description thereof will be omitted.

Also in the apparatus of this embodiment, the compression ratio of the image data can be selected by use of the lookup table 38, and hence it is possible to select a picture quality in the playback operation of the compressed data stored in the memory 32 so as to encode the image data. In addition, since the mode select data for the encoding operation is stored in the memory 32 at an address different from an address where the image data is stored therein, in a playback operation of the playback apparatus, the decoding can be accomplished in association with the encoding mode adopted in the apparatus of FIG. 7 by reading out the pertinent data.

As a method for setting the compression ratio of the image data, other than the method in which the compression ratios are specified with a plurality of predetermined values as shown in the foregoing embodiments such that a desired compression ratio is to be selected therefrom, it is also possible that the operator inputs a desired compression ratio from numeric input means disposed in the picture quality mode setting unit 88, thereby setting the compression ratio.

Figure 8:
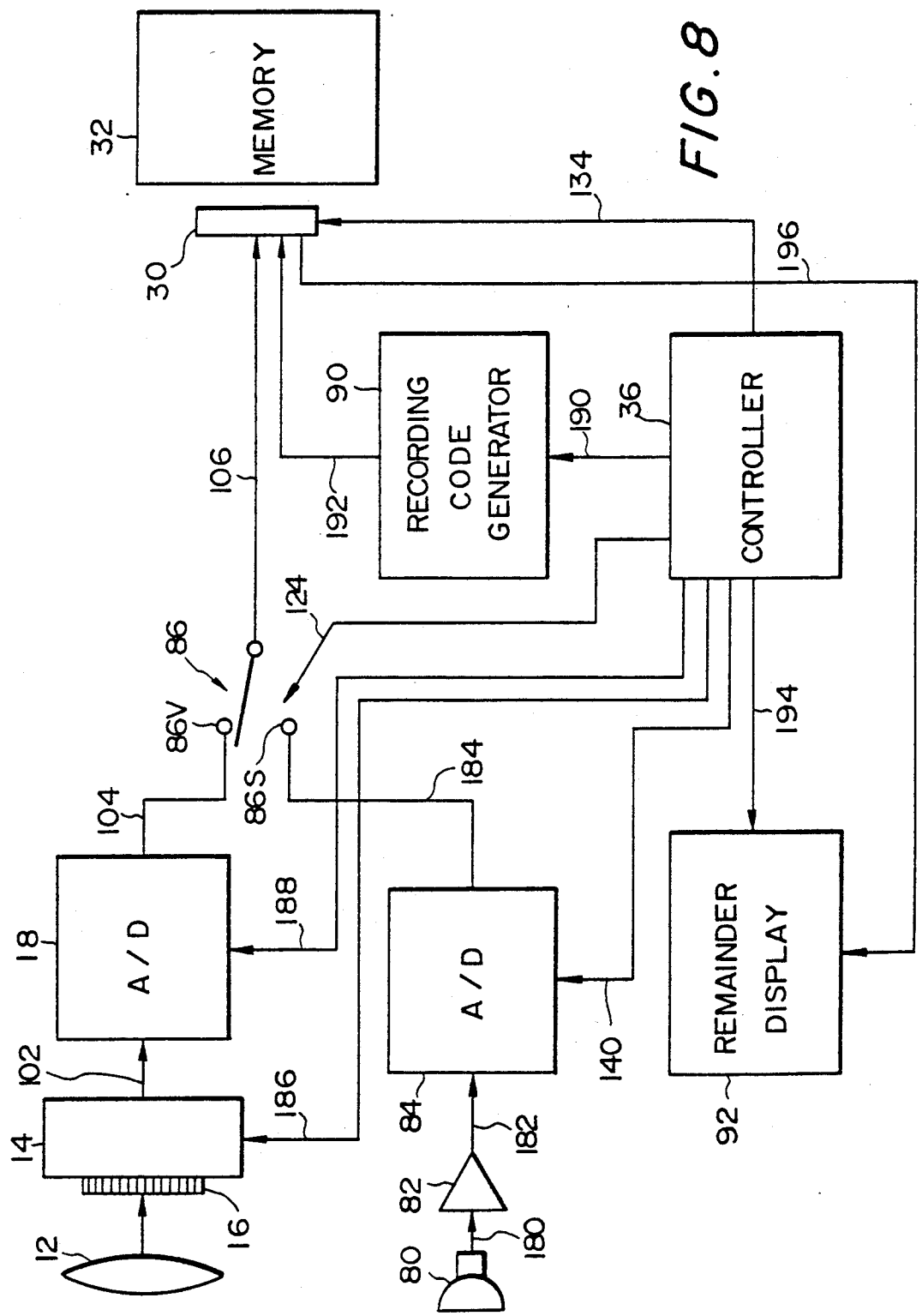
FIG. 8 is a schematic block diagram showing an embodiment in which an image signal recording apparatus according to the present invention is applied to a digital electronic still camera.

FIG. 8 shows an alternative embodiment in which an image signal recording apparatus according to the present invention is applied to a digital electronic still camera.

In this apparatus, the sync signal generator 34 of FIG. 1 is included in a controller 36. In the operation of this embodiment, the image signal converted by an AD converter 18 into a digital signal is sent via a signal line 104 to a terminal 86V of a switch 86.

On the other hand, this apparatus has a microphone 80, which collects a voice from an object so as to deliver an audio signal thereof via a signal line 180 to an amplifier 82. The amplifier 82 amplifies the audio signal received from the microphone 80 to send the amplified audio signal via a signal line 182 to an AD converter 84. The AD converter 84 is operative in response to a clock pulse received from the controller 36 via a signal line 140 so as to convert the audio signal fed from the amplifier 82 into a digital signal, which is transmitted via a signal line 184 to a terminal 86S of the switch 86.

In the switch 86, the terminal 86V or 86S is selected according to a control signal received via a signal line 124, so that the image signal sent from the AD converter 18 or the audio signal delivered from the AD converter 84 is selected, thereby feeding the selected signal via a signal line 106 to a connector 30. When the terminal 86V is connected, data of the image signal sent from the AD converter 18 is supplied to the connector 30 at a high rate, for example, 115 megabits per second. In addition, when the terminal 86S is selected, data of the audio signal sent from the AD converter 84 is supplied to the connector 30 at a low rate, for example, 240 kilobits per second. Consequently, first, a picture of image data is delivered to the connector 30 and then the audio data is sent to the connector 30 for a predetermined period of time thereafter.

Although not shown, it is also possible to arrange, between the switch 86 and the connector 30, a buffer memory, which temporarily stores the data of the image signals alternately received from the switch 86 at different transmission rates such that the stored data is read therefrom at a speed suitable for the write operation thereof in the memory 32 so as to be delivered to the connector 30.

A recording code generator 90 generates a recording code in response to a control signal received from the controller 36 via a signal line 190 depending on the amount of the video and audio data to be recorded in the memory 32 and then transmits the generated code via a signal line 192 to the connector 30.

A remainder display section 92 determines the amount of video and audio data already stored in the memory 32 depending on the recording code read out from the memory 32 via the connector 30 so as to display the amount of video and audio data to be recorded in the unused area of the memory 32. For example, the remainder display section 92 displays the number of sheets of picture data to be stored in the memory 32, or in a case of the audio data, the period of time represented in seconds available for the recording of the audio data.

The connector 30 is detachably connected to the memory 32 such that the connector 30 writes in the memory according to a control signal received from the controller 36 via a signal line 134 data received from the switch 86 via the signal line 106 and data received from the recording code generator 90 via the signal line 192. Furthermore, the connector 30 reads, in response to a control signal from the controller 36, the recording code stored in the memory 32 so as to send the code via a signal line 194 to the remainder display section 92.

The memory 32 is loaded with data of a still picture and data of a voice associated therewith.

The controller 36 transmits control signals respectively via a signal line 186 to the imaging device 14, via a signal line 188 to the AD converter 18, via a signal line 140 to the AD converter 84, via the signal line 124 to the switch 86, via the signal line 190 to the recording code generator 90, via the signal line 194 to the remainder display section 92, and via the signal line 134 to the connector 30, thereby controlling operations of the respective sections.

Next, the operation of this apparatus will be described. When a shutter, not shown, is opened and is then closed so as to conduct a shooting operation of an object, an optical image of the object focused by a master lens 12 is converted by the imaging device 14 from an optical image into a video signal, which is then digitalized by the AD converter into a digital signal so as to be supplied to the terminal 86V of the switch 86.

On the other hand, audio from the object collected by the microphone 80 is amplified by the amplifier 82 and is then sent via the signal line 182 to the AD converter 84. The audio signal is converted into a digital signal in the AD converter 84 so as to be supplied to the terminal 86S of the switch 86.

Figure 10:
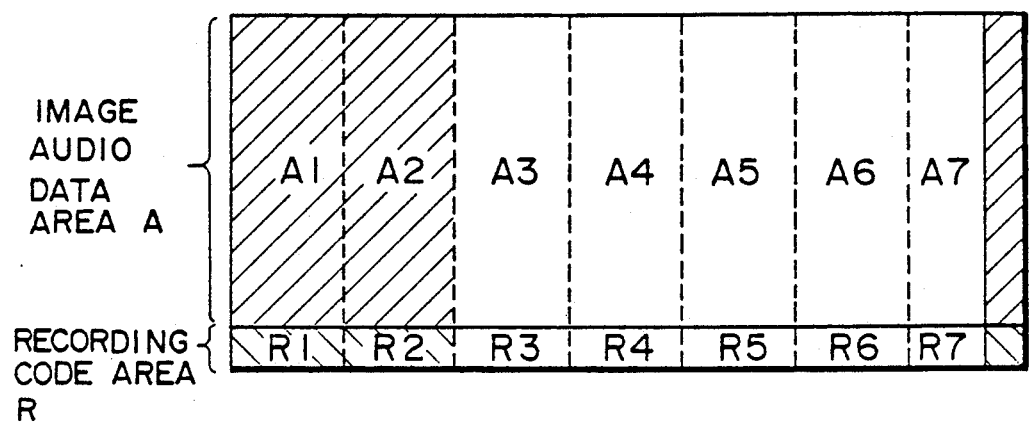
FIG. 10 is a block diagram showing an example of storage contents of a memory in which data is stored by the apparatus of FIG. 8.

In response to a control signal from the controller 36, the switch 86 is connected to the side of the terminal 86V such that the image data of the video signal received from the AD converter 18 is fed via the signal line 106 to the connector 30 at a high data rate of video signals so as to be recorded in a predetermined area of the memory 32 according to a control signal from the controller 36. The memory 32 in this embodiment, as shown in FIG. 10, comprises an image audio data area A to record image data and audio data and a recording code area R to record a recording code. In a case where only image data is to be recorded, seven sheets of picture data can be respectively recorded in seven areas A1–A7 of the image audio data area A. In consequence, the first sheet of image data is loaded in the area A1.

When the first sheet of image data is recorded in the area A1 in response to a control signal supplied from the controller 36 via the signal line 134 to the connector 30, the controller 36 sends via the signal line 190 to the recording code generator 90 a signal indicating that the area A1 is already used for the write operation, namely, that 1/7 of the image audio data area of the memory 32 is used for the recording operation. In response thereto, the recording code generator 90 produces a code signal indicating that the recording operation has been conducted in the area A1 and then outputs this code signal via the signal line 192 to the connector 30. The code signal is fed therefrom so as to be recorded in an area R1 of the memory 32.

When the first sheet of picture data is written in the memory 32, the switch 86 is changed over to the side of the terminal 86S in response to a control signal from the controller 36 such that data of the audio signal sent from the AD converter 84 is fed to the connector 30 at a low data rate of audio signals so as to be recorded in the memory 32. The audio data is written, for example, in a portion of the area A7 as shown in FIG. 10.

After the audio data is recorded in a portion of the area A7, the controller produces a signal indicating that the recording operation has been conducted in the portion of the image audio data area A7 and then outputs this signal via the signal line 190 to the recording code generator 90. In response thereto, the recording code generator 90 produces a code signal indicating that the recording operation has been effected on the portion of the area A7 and then delivers the signal via the signal line 192 to the connector 30. The code signal is fed therefrom so as to be recorded in the recording code area R7 of the memory 32.

When the first still image and the audio associated therewith are stored in the memory 32 such as a memory card, in response to a control signal received from the controller 36 via the signal line 134, the codes recorded in the recording code areas R1 and R7 of the memory 32 are read therefrom so as to be fed via the connector 30 and the signal line 196 to the remainder display section 92. In this situation, since the recording operation has been completed in the area A1 and a portion of the area A7 of the image audio data area A, the remainder display section 92 displays as the remaining amount of the memory 32 the amount of image data or audio data associated with the capacity of the areas A2–A6 and the capacity of the portion of the area A7. That is, the remainder display section 92 displays in a case of image data that five sheets of image data can be further recorded in the image audio data areas A2–A6 and in a case of audio data an indication of a period of time available for the recording of the areas A2–A6 and the remaining capacity of the area A7, for example, in the form of x minutes y seconds.

For the operator of this camera, it is possible to know the number of picture sheets to be further produced or the period of time available for the recording of audio data by visually checking the display on the remainder display section 92 so as to effect a shooting operation in consideration thereof.

When the operator shoots a second sheet of image data, as in the operation described above, the switch 86 is connected to the terminal 86V. The image data focused by the master lens 12, is converted into a video signal through the imaging device 14, and transformed into a digital signal by the AD converter 18 is sent via the switch 86 to the connector 30 so as to be written in the memory 32. The image data is recorded in the area A2 of the image audio data area A.

Thereafter, as in the case of the first sheet of image data, a control signal indicating that a data recording operation has been conducted in the area A2 is fed from the controller 36 via the signal line 190 to the recording code generator 90, which in turn produces a code signal designating that the recording operation has been completed in the area A2 and then delivers the code signal via the signal line 192 to the connector 30. The code signal is recorded in the recording code area R2 of the memory 32.

If the audio is not recorded in the shooting operation of the second sheet of image data, after the shooting operation, as shown in FIG. 10, the areas A1-A2 and a portion of the area A7 of the image audio data area A are indicated to have undergone recording operations. Thereafter, as in the case of the first image data, in response to a control signal sent from the controller 36 via the signal line 134, the code stored in the recording code area R of the memory 32 is read out therefrom and sent via the signal line 194 to the remainder display section 92, which in turn displays the remaining area of the memory 32 available for the recording operation. In this situation, as described above, since the areas A1-A2 and a portion of the area A7 of the image audio data area A are indicated to have undergone the recording operations, the remainder display section 92 displays in the case of the image data an indication that four sheets of image data can be further recorded in the image audio data areas A3-A6 and in the case of the audio data an indication of the period of time available for the recording operation in the areas A3-A6 and the remaining capacity of the area A7 in the form of, for example, x minutes y seconds.

According to the apparatus, it is also possible that image data produced through the imaging device 14 and audio data collected by the microphone 80 undergo a selection through the switch 86 so as to be respectively stored in the memory 32. In addition, since a recording code designating that image data or audio data has been recorded in the image audio data area A of the memory 32 and is produced from the recording code generator 90 so as to be written in the recording code area R of the memory 32, by reading out the recording code therefrom each time an image shooting operation or a voice recording operation is achieved, the remaining amount of the memory 32 available for the recording operation can be displayed in the remainder display section 92. In consequence, the operator can obtain information about the remaining amount of the memory 32, more particularly, the number of sheets of image data to be further recorded therein or the period of time available for an audio data recording operation, thereby enabling the shooting operation to be effected according to a schedule. As a result, it is possible to prevent a case where due to an insufficient remaining amount of the memory 32, a shooting operation is to be abandoned at an intermediate point of the shooting operation.

Figure 11:
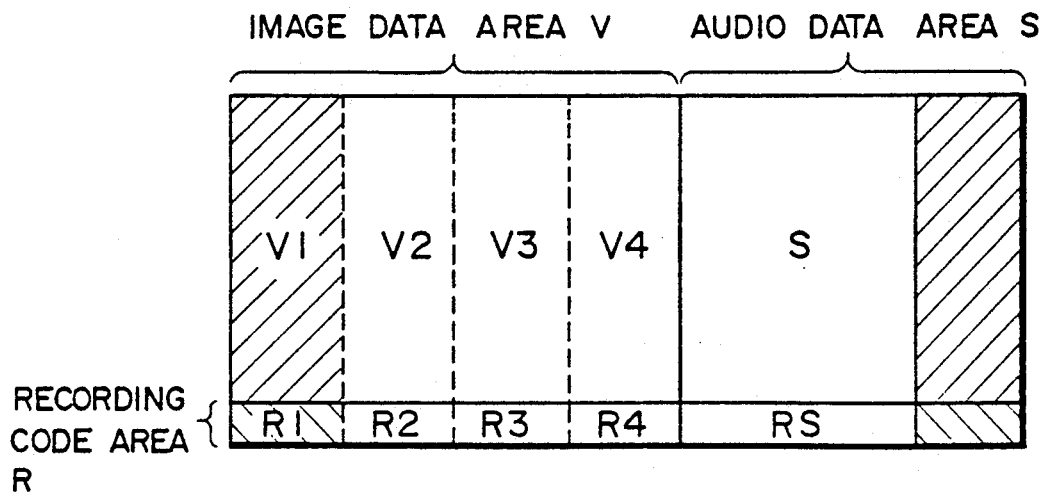
FIG. 11 is a block diagram showing another example of storage contents of a memory in which data is stored by the apparatus of FIG. 8.

FIG. 11 shows another method of recording data in the memory 32. In this example, in place of the image audio data area A of FIG. 10, an image data area V to record an image data and an audio data area S to store voice data are disposed. The image data area V is loaded only with image data, namely, in the embodiment of FIG. 10, four sheets of image data are sequentially recorded in the areas V1-V4 beginning from the area V1. In this diagram, there is shown a state where image data is recorded only in the area V1. On the other hand, the audio data area S is loaded with audio data in a sequential fashion beginning from the right-most position in the diagram in which the shade portions indicate recorded areas.

In a case as described above where the area to record image data is separated from the area to record audio data, the remaining amount of the area available for the recording operation to be displayed in the remainder display section 92 is, for image data, the capacity of the unrecorded portion of the image data area V and is, for audio data, the capacity of the unused portion of the audio data area S. In consequence, for example, as shown in FIG. 11, when the recording operation is completed only in the area V1 of the image data area V, the remaining amount for the image data includes three sheets of image data to be stored in the areas V2-V4 and hence there is indicated "Three sheets" as the available remaining area for image data. In addition, as the remaining amount for audio data, the display section 92 displays the period of time for the audio data associated with the unrecorded portion of the audio data area S.

Figure 9:
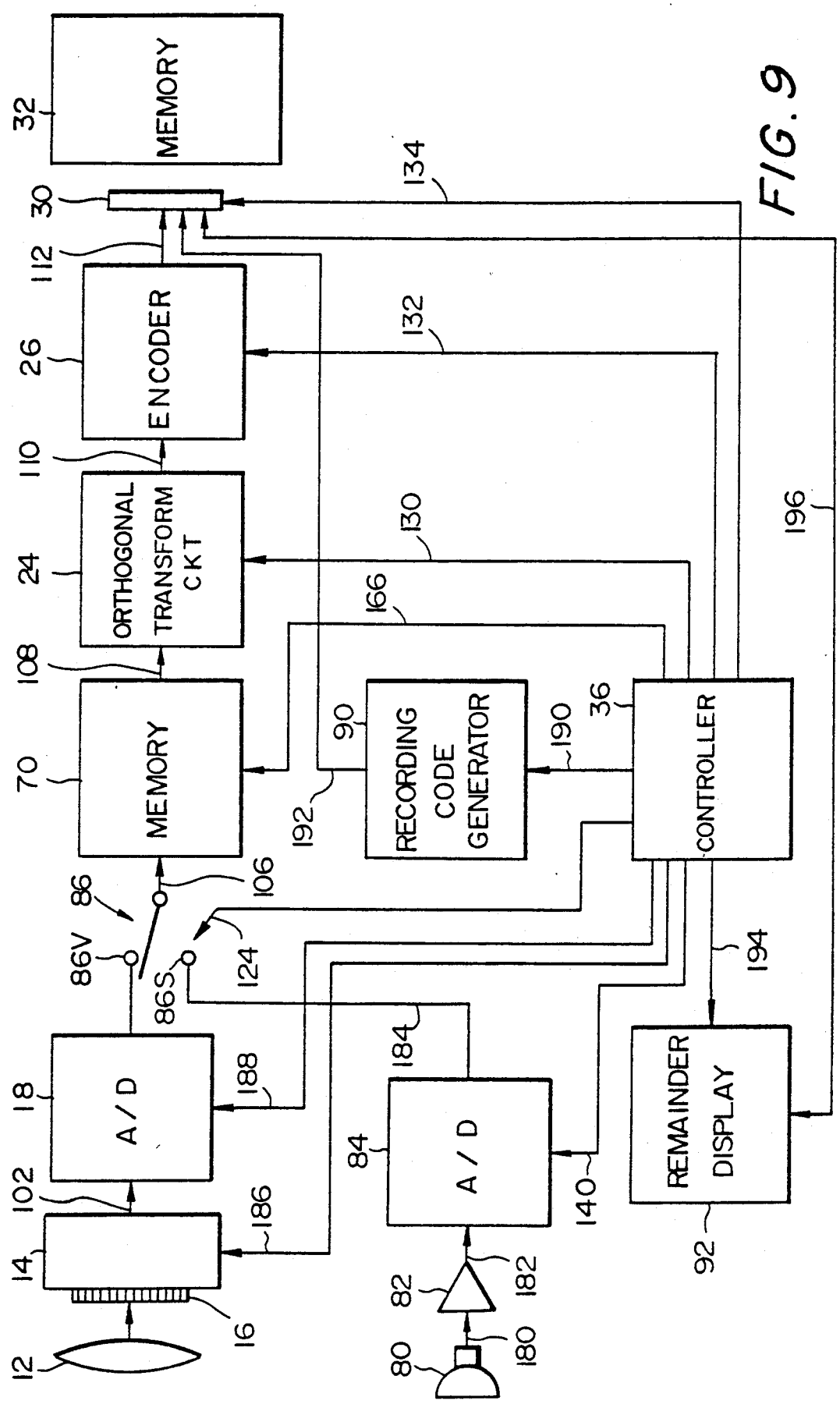
FIG. 9 is a schematic block diagram showing an alternative embodiment in which an image signal recording apparatus according to the present invention is applied to a digital electronic still camera.

FIG. 9 shows an alternative embodiment of the image signal recording apparatus according to the present invention. In this apparatus, the remaining area available for the recording operation is displayed and the image data as well as audio data are compressed so as to be stored in a memory 32.

In this apparatus, a switch 86 produces an output, which is connected via a signal line to an input port of a memory 70. When the switch 86 is connected to the terminal 86V, data of the image signal sent from an AD converter 18 is written in the memory 70 at a high data rate of video signals, for example, 115 megabits per second. In addition, when the connection is effected on the terminal 86S, data of the audio signal received from the AD converter 84 is stored in the memory 70 at a low rate of audio signals, for example, 240 kilobits per second. Consequently, for example, a picture of image data is first written in the memory 70 and then the audio data is stored therein for a predetermined period of time thereafter.

The memory 70 is a data storage which temporarily stores data of the image signal and audio signal data associated therewith. In response to a control signal sent from a controller 36 via a signal line 166, the memory reads out the image signal data and audio signal data accumulated therein at a data rate suitable for a write operation of the data into the memory 32 via a connector 30, which will be described later, thereby delivering the data via a signal line 108 to a orthogonal transform circuit 24. In this embodiment, in order that the orthogonal transformation is conducted on the image and audio data in the orthogonal transformation circuit 24, the memory 70 outputs the image and audio data in the blocked format to the orthogonal transformation circuit 24.

The orthogonal transformation here means a transformation of predetermined quantities of digitalized image or audio data into signals associated with various frequencies. In a general image, the low-frequency component occupies a large portion with respect to power and the high-frequency component appears only in a small portion thereof; consequently, data items undergone the orthogonal transform usually concentrate on the low-frequency component. In addition, also in the audio data, the low-frequency portion occupies a great portion with respect to power and there appears only a small high-frequency component. Particularly, audio collected at a low-speed includes a large low-frequency component. In consequence, by storing the low-frequency component of the data after the orthogonal transformation, the original image and audio can be substantially reproduced, in other words, by recording only the low-frequency component, it is possible to store a large volume of data in a storage having a small capacity.

The orthogonal transform circuit 24 effects the orthogonal transformation, as described above, on each block of the blocked image and audio data received from the memory 70. The data transformed in the orthogonal transform circuit 24 is delivered via a signal line 110 to an encoder 26, which encodes the data as described above. The data encoded by the encoder 26 is fed via a signal line 112 to the output terminal 30.

The data write operation from the output terminal to the memory 32 is effected at the same speed for the image data and the audio data because these data items are read from the memory 70 at the same speed. The memory 32 is loaded with the encoded still picture and encoded voice associated therewith.

The other components and operations are identical to those of FIG. 8, and hence description thereof will be omitted. Also in the apparatus of FIG. 9, since a recording code indicating that image or audio data has been recorded in the image audio data area A of the memory 32 is produced from a recording code generator 90 so as to be written in the recording code area R of the memory 32, by reading out this recording code each time an image shooting operation or a voice recording is achieved, the amount of the remaining area of the memory 32 available for the recording operation can be displayed by means of a remainder display section 92.

Furthermore, in this apparatus, image data produced from an imaging device 14 and audio data collected by a microphone 80 undergo a selection through the switch 86 so as to be stored in the memory 70 at the respective data rates such that the stored data are read out therefrom at a speed suitable for a write operation thereof in the memory 32 as a recording medium. In consequence, the image and audio data items stored at the different data rates are then read out therefrom at an identical rate and hence the data items can be efficiently stored in the memory 32.

In addition, the image data and the audio data attained from the memory 70 are processed to constitute data blocks and are then subjected to the orthogonal transform so as to be encoded, thereby minimizing the volume of data to be stored in the memory 32, so that the image data and the audio data are stored in the compressed form. As a result, it is possible to store a great amount of image and audio data in the memory 32 having relatively a small capacity.

Incidentally, according to the embodiment above, although a description has been provided for an apparatus in which an orthogonal transformation and encoding are adopted as means to compress the image and audio data, the data compression need only be achieved to reduce the amount of data by removing the redundancy of the signal. Accordingly, there are available in addition to the orthogonal transformation above either an adaptive encoding, a differential pulse code modulation, DPCM, a block encoding, a vector quantization, or a combination thereof.

In addition, it may also possible that the image data be separated into the respective color components so as to undergo the data compression such as a orthogonal transform and an encoding. In this case, data for each color component need only be read out for the orthogonal transform.

Furthermore, in the description of the embodiment above, although the present invention is applied to an electronic still camera, the present invention is not restricted to the electronic still camera but is applicable to any apparatus, such as a movie camera in which images and voices are recorded.

According to the present invention, since the compression ratio of image data to determine the picture quality is selectable, the image data can be encoded so as to be reproduced with a desired picture quality in the playback operation. Furthermore, the selection data of the compression ratio in the compression encoding is stored in an area of a recording medium different from an area where the image signal is stored therein; consequently, in a playback operation, by reading out the data, the image signal undergone the compression encoding can be appropriately expanded for a decoding thereof.

According to the present invention, the image data obtained by a shooting operation and the audio data collected therein are subjected to a selection so as to be recorded in a recording medium and recording codes associated with the amounts of the image and audio data are produced and are then stored in the recording medium. As a consequence, by reading out the recording codes, the remaining amount of the recording medium can be displayed, which enables the operator to effect a shooting operation according to a schedule.

While the present invention has been described with reference to particular illustrative embodiments, it is not restricted by those embodiments but only by the appended claims. It is to be understood that those skilled in the art can change or modify the embodiments without departing from the scope and spirit of the present invention.

What is claimed is:

1. An image and audio signal compression recording apparatus for receiving both an image signal and an audio signal so as to effect a compression coding on data of the image and audio signals, thereby recording the compressed data in a recording medium comprising:
   first select means responsive to a control signal for selecting image signal data or audio signal data;
   blocking means for dividing data selected by said first select means into blocks;
   orthogonal transform means for effecting an orthogonal transform on the data blocked by said blocking means;
   coding means for compressing and for coding the data orthogonally transformed in said orthogonal transform means;
   second select means for selecting compression ratio data to be employed in the compression coding effect on the orthogonally transformed data; and
   data write means for writing the compressed code data in one area of the recording medium and for writing the compression ratio data in another area of the recording medium,
   said data write means writing the compressed code data and the compression ratio data, respectively, in different areas of the recording medium.

2. An image and audio signal expansion playback apparatus for effecting an expansion playback on compressed code data including both image and audio signals recorded in a recording medium comprising:
   single data read means for reading from the recording medium both said image signal and audio signal data including having undergone a compression coding and compression ratio data adopted in the compression coding; and
   single decoding means for effecting an expansion decoding on the compressed coded data by use of the compression ratio data read from the recording medium by said data read means.

3. An image and audio signal compression recording apparatus in accordance with claim 1, wherein said coding means achieves a compression coding on the image data by use of data read from a lookup table.

4. An image and audio signal expansion playback apparatus in accordance with claim 2, wherein said decoding means effects an expansion decoding on the compressed coded data by use of data read from a lookup table.

5. An image and audio signal compression recording apparatus in accordance with claim 1, wherein said compression ratio data is a number of bits allocated to each frequency component of the orthogonally transformed image and audio signal data.

6. An image and audio signal expansion playback apparatus in accordance with claim 2, wherein said compression ratio data is a number of bits allocated to each frequency component of the orthogonally transformed data.

7. An image and audio signal recording apparatus in which image data of an image signal produced by imaging means is recorded in a recording medium together with audio data of an audio signal collected by audio collecting means comprising:
blocking means for dividing the image data and the audio data into blocks;
common orthogonal transform means for achieving an orthogonal transform on the image data and the audio data respectively blocked by said blocking means; and
single coding means for compressing and for coding the orthogonally transformed image data and the audio data, respectively;
recording code generator means for producing recording codes associated with amounts of the image data and the audio data to be recorded in the recording medium;
data input/output control means for writing the image data in a first area of said recording medium and for writing the audio data in a second area of said recording medium and for controlling write and read operations of the recording codes produced by said recording code generator means in said recording medium; and
recording medium remainder display means for displaying a remaining amount of the first area and the second area in said recording medium available for a recording operation;
said data input/output control means reading out the recording codes stored in said recording medium so as to cause said recording medium remaining display means to display the remaining amount of the first area and the second area available for a recording operation.

8. An image signal recording apparatus in accordance with claim 7, further comprising:
selecting means for selecting compression ratio data to be employed in the compression coding of the image data in said coding means;
said data input/output control means further writing in said recording medium the compression ratio data selected by said selecting means.

9. An image and audio signal compression recording apparatus in accordance with claim 1 and additionally including control means generating respective control signals for said first select means, said orthogonal transform means, and said coding means.

10. An image and audio signal compression recording apparatus in accordance with claim 9 and additionally including buffer memory means connected between said first select means and said orthogonal transform means.

11. An image and audio signal compression recording apparatus in accordance with claim 9 wherein said first select means comprises switch means responsive to said control means.

* * * * *